United States Patent [19]

Rasmussen, deceased et al.

[11] Patent Number: 4,500,068
[45] Date of Patent: Feb. 19, 1985

[54] AIR VALVE

[75] Inventors: Donald C. Rasmussen, deceased, late of Barrington, Ill., by Jaunice O. Rasmussen, executor; James A. Kozel, deceased, late of Elmhurst, Ill., by Violet M. Kozel, executor

[73] Assignee: The Singer Company, Stamford, Conn.

[21] Appl. No.: 480,983

[22] Filed: Mar. 31, 1983

[51] Int. Cl.³ .............................................. F16K 1/00
[52] U.S. Cl. ................................... 251/205; 251/333; 251/129
[58] Field of Search ............... 251/122, 129, 205, 333, 251/DIG. 4

[56] References Cited

U.S. PATENT DOCUMENTS

| | | | |
|---|---|---|---|
| 1,760,391 | 5/1930 | Williams et al. | 251/122 |
| 3,140,073 | 7/1964 | Finck, Jr. | 251/129 |
| 3,430,654 | 3/1969 | Mills | 251/335 R X |
| 3,654,950 | 4/1972 | Hamm | 251/333 X |
| 3,746,041 | 7/1973 | Friedland | 251/30 X |

FOREIGN PATENT DOCUMENTS 755545  8/1956  United Kingdom ............... 251/333

Primary Examiner—Samuel Scott
Assistant Examiner—Kenichi Okuno

[57] ABSTRACT

Flow from the inlet chamber to the outlet chamber is regulated by the sleeve valve moving relative to the metering cone fixed in the valve body. The valve is guided in the stainless steel ring molded into the partition between the chambers. The valve is actuated by a hybrid linear actuator. The valve seats on the shoulder or flange and the effects of lift-off of the valve are minimized by the sharp edge on the valve and by the uniform diameter section of the metering cone. The sleeve valve is offset inwardly so the I.D. at the sharp edge is the same as the O.D. where the valve passes through the ring. This prevents loss of control of the valve. The valve hits a stop before the sleeve clears the cone and this prevents the valve from reaching a position in which the actuator and return spring have no effect.

6 Claims, 3 Drawing Figures

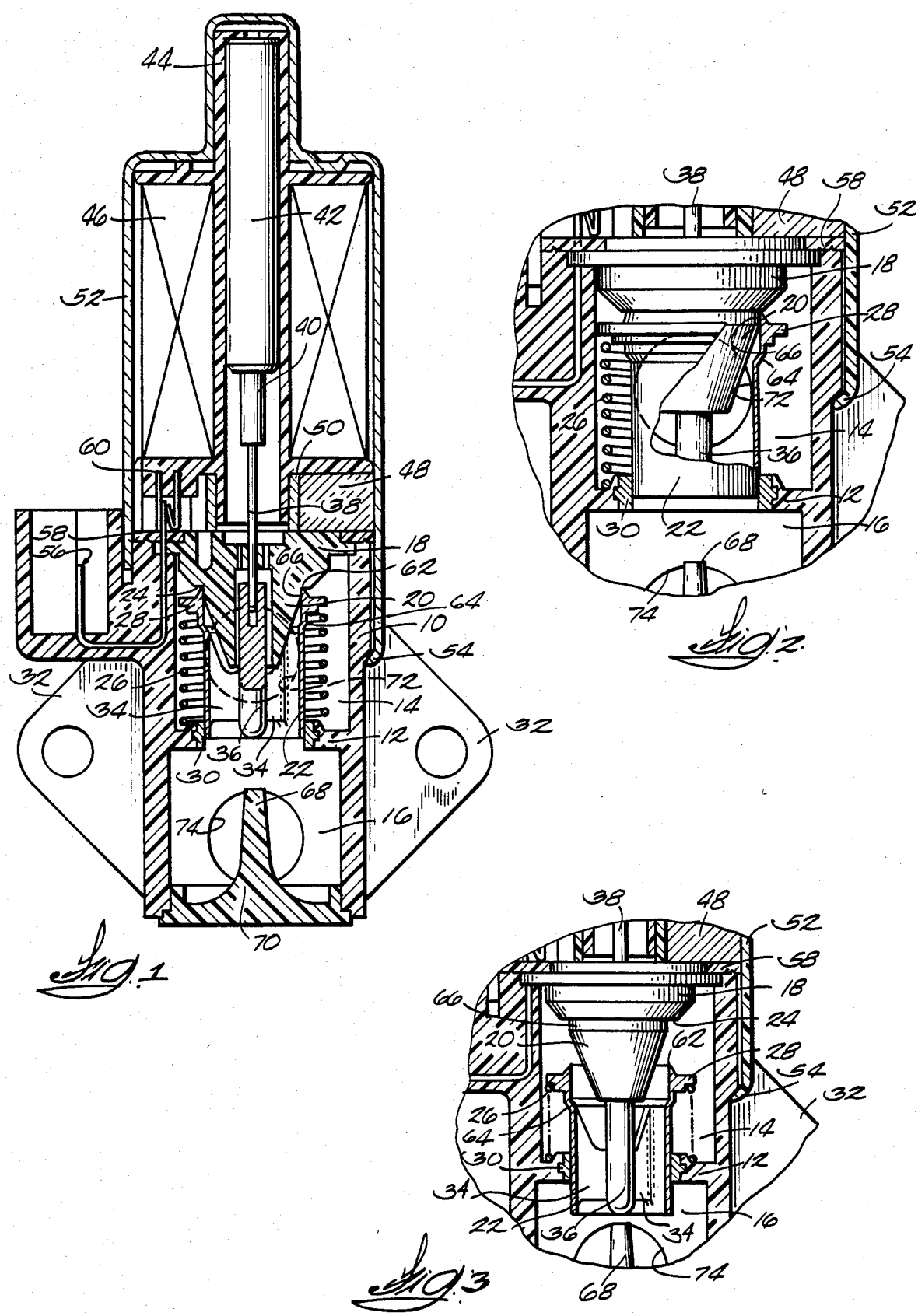

AIR VALVE

BACKGROUND OF THE INVENTION

This invention relates to an air metering valve which is part of an automobile carburetor system. The most usual automotive carburetors have butterfly valves regulating the air flow and utilizing a venturi to meter the fuel to the air stream. With the increasing emission standards, it becomes increasingly important to accurately control the air/fuel mixture going to the engine. The present air metering valve is designed to control the amount of air being by-passed to the engine to control the amount of air/fuel mixture at idle speed and higher speeds in accordance with the oxygen content as sensed in the exhaust. The actual relationship to the carburetor is unimportant. It is sufficient to understand that this air flow control valve must accurately regulate flow in response to a variable electrical input signal.

The control system generates a control signal of variable current strength or a modulated current pulse which is applied to an electromagnetic linear hybrid actuator which positions the present sleeve valve.

CROSS-REFERENCE TO RELATED APPLICATION

The hybrid actuator briefly mentioned here is more fully disclosed in application Ser. No. 473,888, filed Mar. 10, 1983.

SUMMARY OF THE INVENTION

An object of this invention is to provide an air metering valve which will accurately meter air flow to an engine. The valve includes a sleeve valve which is positioned relative to a nose or metering cone in response to a control signal. The metering cone shape is designed to give the desired air flow at any position of the sleeve valve.

Another object of this invention is to immunize the sleeve valve from lift-off effects as it lifts from its seat. Thus, when the seated sleeve valve just lifts off, the cone design provides minimal effect and uniform flow for a short linear travel of the sleeve valve to permit the pressures to stabilize.

Another object of this invention is to minimize lift-off forces on the sleeve valve and this is accomplished by providing a sharp edge seating on the valve seat.

Another object is to prevent the sleeve valve modulation or change of position with variation in pressure drop across the valve. This is accomplished by providing an offset whereby the I.D. of the sharp edge of the sleeve valve is the same as the O.D. of the sleeve where it passes through the partition separating the inlet and outlet chambers to thereby minimize the pressure drop across the sleeve cross-section area.

To minimize cost, the valve body is made of plastic. This can result in distortion in mounting the valve or in molding the valve body. This distortion can reflect in binding on the sleeve valve where it passes through the chamber partition. An object of this invention is to prevent such binding or distortion. This is accomplished by molding a metal ring into the partition to serve as a guide. The ring will not distort, even though the valve body may be distorted slightly during mounting or molding.

Still another object of this invention is to prevent loss of control of the sleeve valve. This is done by preventing the sleeve valve from traveling beyond the end of the cone where the valve itself would become the restrictor and could cause the valve to hang up in a wide open position until the pressure differential decreases substantially and causes the valve to jump to a new position.

BRIEF DESCRIPTION OF THE DRAWINGS

FIG. 1 is a vertical section through the valve and the linear actuator.

FIG. 2 is an enlarged detail showing the sharp edge of the sleeve valve and the uniform diameter of the cone minimizing lift-off forces when the valve is unseated. This view also has part broken away to show the inlet to the upper chamber of the valve body.

FIG. 3 is a detail of a portion of FIG. 1 showing the sleeve valve partly open and its relationship to the metering cone.

DETAILED DESCRIPTION OF THE DRAWINGS

The plastic valve body 10 has an internal partition 12 separating the inlet chamber 14 and the outlet chamber 16. An insert 18 is press fit into the upper end of the body with the computer generated metering cone 20 depending into inlet chamber 14. Sleeve valve 22 is biased into engagement with seat 24 on the insert 18 by spring 26 compressed between the flange 28 on the sleeve valve and the partition 12. The lower end of the sleeve valve is guided in the stainless steel ring 30 molded into the valve body. The stainless steel ring is strong enough to resist minor deflection or bending which might be imposed on the valve body when the valve is mounted on the carburetor assembly by bolts passing through the holes in mounting ears 32, 32.

The sleeve valve has three radial ribs 34 connecting the sleeve and the center post 36. Non-magnetic pin or valve stem 38 is press fit into the blind hole in the upper end of the post 36. The stem 38 is mounted with the aid of a gauge so that the dimension of the projecting portion of the pin is precise. The stem 38 passes through the central opening in the insert 18 and engages the end of the reduced portion 40 of the ferromagnetic plunger 42 slideable in the plastic center tube 44.

The plunger 42 moves in response to current flow in coil 46. Current flow may be continuous or may be pulsed with the width of the pulse determining the effective magnitude of the current. The plunger is also influenced by the effect of magnets 48 and shading coils 50. The full details of this hybrid arrangement are not relevant to the discussion of the valve. Further details may be determined by reference to said co-pending application. For the present purposes it need be noted only that this hybrid linear actuator has operating characteristics superior to any other type actuator. It is ideally suited to the present situation. The linear actuator assembly is enclosed in the ferromagnetic shell or casing 52 the lower end of which is rolled over at 54 to interconnect the linear actuator and the valve body. The valve body has terminals 56 molded into the body and projecting upwardly to pass through the gasket 58 between the linear actuator and the valve body and project into the sockets 60 in the actuator assembly.

The sleeve valve 22 has a sharp upper edge 62 which seats on the seat 24 at the base or wide part of the cone structure. This sharp edge minimizes the lift-off forces on opening the valve. It will be noted the sleeve is provided with an offset 64 slightly below the shoulder 28. This is carefully dimensioned so that the outside diameter of the portion below the offset is the same as the inside diameter of the portion above the offset. The offset has to be far enough from the seat end of the valve so the reduced diameter does not take over the metering function. The clearance between the "corner" and the cone has to be greater than the clearance between the sharp end and the cone. The offset prevents the pressure drop across the valve from acting on the sleeve valve and taking control of the valve. Without the offset, the pressure differential can actually open the valve to full open when a low pressure (high vacuum) is encountered at the outlet. Thus, the offset prevents the valve from modulating with vacuum variations.

Immediately below the seat 24 the cone 20 has an essentially uniform diameter section 66. This allows lift-off forces acting on the valve immediately after opening to be minimized. This relatively uniform flow section permits lift-off forces to diminish and be masked by the spring travel before the shaped portion or conical portion of the cone is reached. The shape of the cone is carefully calculated to give the air flow desired. As the current flow (or pulse width) increases in the coil, the valve is opened more and more, until finally the center portion 36 strikes the stop 68 carried by the end closure 70. If it were not for this stop, the valve could continue opening until the valve becomes the restrictor and, in effect, permits significant flow forces to build up which would hold the sleeve in a wide open position until the force of the coil plunger was reduced significantly, whereupon the valve would jump to the correct position. The provision of the stop prevents this occurrence.

From the foregoing, it will be apparent that as the current or pulsed current in the coil 46 is increased the plunger moves downwardly to progressively open the sleeve valve. As the valve opens the flow enters inlet 72, flows through the space between the sleeve valve and the metering cone down to the center of the sleeve valve and exits through outlet 74. This structure meters the flow precisely.

It is claimed:
1. An air valve comprising,
   a body having an inlet and an outlet,
   a partition in the body between the inlet and outlet and separating the interior of the body into inlet and outlet chambers,
   a sleeve valve slideably mounted in the partition,
   a generally conical metering cone fixed in the inlet chamber,
   said sleeve valve being reciprocable relative to the cone,
   a spring biasing the sleeve valve to a seat surrounding the base of said cone,
   a stem connected to the valve and projecting through the cone,
   an actuator acting on the stem to position the sleeve valve relative to the cone, the air flow from the inlet to the outlet being in the clearance between the sleeve valve and the cone,
   the sleeve valve having an inward offset near the end which engages the seat whereby the outside diameter of the sleeve valve for the greater part of its length is substantially the same as the inside diameter of the sleeve valve between the offset and the end which engages the seat.

2. An air valve according to claim 1 in which the sleeve valve has a sharp edge which engages the seat.

3. An air valve according to claim 2 in which the portion of the cone adjacent the seat has a generally uniform diameter to permit flow and the forces acting on the sleeve valve to stabilize after the valve lifts off and during initial movement of the sleeve valve from the seat by the actuator.

4. An air valve according to claim 3 including a stop engaged by the valve to limit opening movement of the valve to a position in which the clearance between the valve and the cone functions to meter the flow.

5. An air valve according to claim 4 in which the valve body is plastic and a metal ring is molded into said partition to guide the sleeve valve.

6. An air valve according to claim 1 in which said actuator is a linear actuator having a ferromagnetic core positioned in accordance with current flow in a coil, said stem being nonmagnetic.

* * * * *